United States Patent Office 3,061,619
Patented Oct. 30, 1962

3,061,619
METHOD OF PREPARING OMEGA-MERCAPTO-SUBSTITUTED ACYCLIC ORGANIC COMPOUNDS
John B. Braunwarth, Crystal Lake, and Gifford W. Crosby, River Forest, Ill., assignors to The Pure Oil Company, Chicago, Ill., a corporation of Ohio
No Drawing. Filed Nov. 18, 1960, Ser. No. 70,113
31 Claims. (Cl. 260—399)

This invention relates to new and useful improvements in methods of preparing omega-mercapto-substituted acyclic organic compounds, and derivatives thereof, by reaction of mercaptans with the intermediate product formed by reaction of a redox reducing agent with carbocyclic organic peroxides.

Many of the reactions of peroxides are known in the prior art. E. G. E. Hawkins, in his article entitled, "Reactions of Organic Peroxides. Part II. Reactions of $\alpha,\alpha$-Dimethylbenzyl Hydroperoxide (Iso-Propylbenzene Hydroperoxide)" (J. Chem. Soc., 1950, 2169) shows the decomposition of $\alpha,\alpha$-dimethylbenzyl hydroperoxide by ferrous sulfate, under the influence of various catalysts and thermal conditions, to form mixtures of 2-phenylpropan-2-ol, acetophenone, and $\alpha$-methylstyrene. The hydroperoxides were first shown by Hock and Lang (Ber., 77, 257, (1944)) to be formed by the oxidation of isopropylbenzene with air to give $Ph \cdot CMe_2OOH$. Improved methods for their preparation are described by Armstrong, Hall and Quin, British Patents 610,293 and 630,286; J. Chem. Soc., 1950, 666. E. G. E. Hawkins and P. P. Young (J. Chem. Soc., 1950, 2804) state that the reaction of methylcyclopentyl hydroperoxide with ferrous sulfate solution gives rise to the formation of dodecane-2,11-dione. However, the use of methylcyclohexyl hydroperoxide gives poorer yields of tetradecane-2,13-dione. N. Brown et al. (J. Am. Chem. Soc., 77, 1756 (1955)) describe the preparation of "cyclohexanone peroxide" by the autocatalyzed, liquid-phase oxidation of cyclohexanol with oxygen. Reaction of these peroxides with ferrous ion in hydrocarbon solution is said by Brown et al. to produce a 68% yield of 1,12-dodecanedioic acid.

M. S. Kharasch and W. Nudenberg, in their article entitled, "Detection of Free Radicals in Solution. III. Formation of Long-Chain, $\alpha,\omega$-Dicarboxylic Acids" (J. Org. Chem., 19, 1921, (1954)), indicate that the decomposition of cyclohexanol hydroperoxide in the presence of ferrous ion and butadiene gives rise to $C_{20}$ unsaturated dicarboxylic acids, each containing two residues of cyclohexanol hydroperoxide and butadiene.

It is one object of this invention to provide a new and improved method of preparing mercapto-substituted acyclic organic compounds, e.g., acids, esters, and ketones.

Another object of this invention is to provide an improved class of mercapto-substituted ketones and esters, the liquid forms of which are particularly useful as functional liquids, e.g., hydraulic fluids, synthetic lubricants, brake fluids, torque converter fluids, etc.

A feature of this invention is the provision of an improved process in which a carbocyclic peroxide is decomposed by reaction with a redox reducing agent and reacted with a mercaptan to produce a mercapto-substituted organic acid, ester, or ketone.

Another feature of this invention is the provision of a new class of organic esters, the long-chain alkyl esters of alkyl- or arylmercapto-substituted organic acids, which include many liquids having the properties desired in functional liquids, e.g., hydraulic fluids, synthetic lubricants, brake fluids, torque converter fluids, etc.

Other objects and features of this invention will become apparent from time to time throughout the specification and claims as hereinafter related.

It has been found in accordance with this invention that compounds of a cyclic structure having a peroxide grouping attached directly to one of the carbon atoms in said cyclic structure (referred to generically as carbocyclic peroxides) when decomposed, as with a redox agent such as the ferrous ion, in the presence of a mercaptan, yield as a main product which is not a dimer but is an omega-mercapto-substituted aliphatic acid, ester, or ketone derived from only one alicyclic nucleus. The reactions involved in the process of this invention are represented broadly as follows:

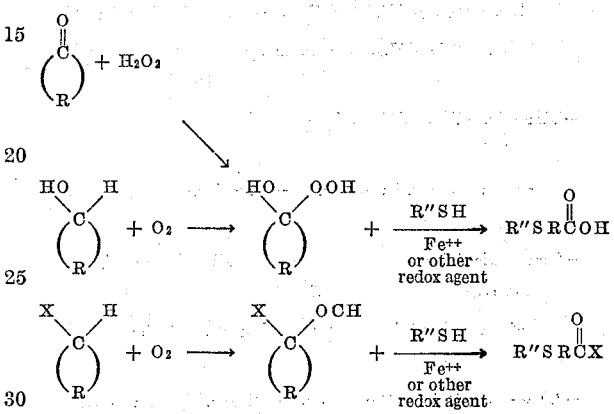

In the above equation, R is a divalent substituted or unsubstituted hydrocarbon radical consisting of a carbon-carbon chain of 3 to 9 carbon atoms, which can be an unsubstituted methylene chain, or can contain an olefinic double bond, or phenylene or cyclohexylene group. The radical R, whether substituted or unsubstituted in basic structure, can contain any substituent which is inert toward the mercaptan reactant or the redox agent and does not condense or polymerize under the conditions of reaction. Substituents, which may be present at any location on the radical R, include, but are not limited to, alkyl radicals, such as methyl ethyl, propyl, butyl, dodecyl, octadecyl, etc., both straight-chain and branched-chain; aryl radicals, such as phenyl, naphthyl, anthracyl, etc.; cycloalkyl radicals, such as cyclohexyl, cyclopentyl, etc.; mixed alkyl-aryl radicals, such as benzyl, tolyl, xylyl, etc.; keto radicals (which can be present within the radical R); hydroxy; carboxy; alkoxy, or aryloxy radicals, such as methoxy, ethoxy, hexoxy, decoxy, phenoxy, etc.; carbalkoxy; and halogen, such as chloro, bromo, fluoro, iodo. X is selected from the group consisting of OH, $C_1$–$C_{18}$ alkoxy or aryloxy, such as methoxy, ethoxy, propoxy, hexoxy, decoxy, phenoxy, benzyloxy, tolyloxy, etc., and $C_1$–$C_{18}$ alkyl, aryl, and cycloalkyl radicals, such as methyl, ethyl, propyl, hexyl, decyl, octadecyl, phenyl, naphthyl, benzyl, tolyl, xylyl, cyclohexyl, etc. R″ is a $C_1$–$C_{18}$ hydrocarbon radical, preferably alkyl, aryl, cycloalkyl, or mixed, including straight-chain and branched-chain radicals.

Examples of R in the primary ring structure of the above equations and formulae include,

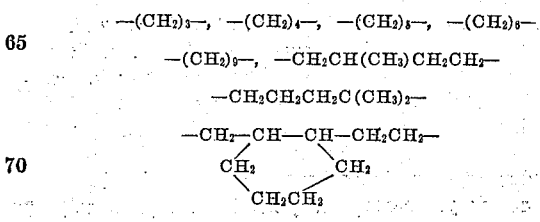

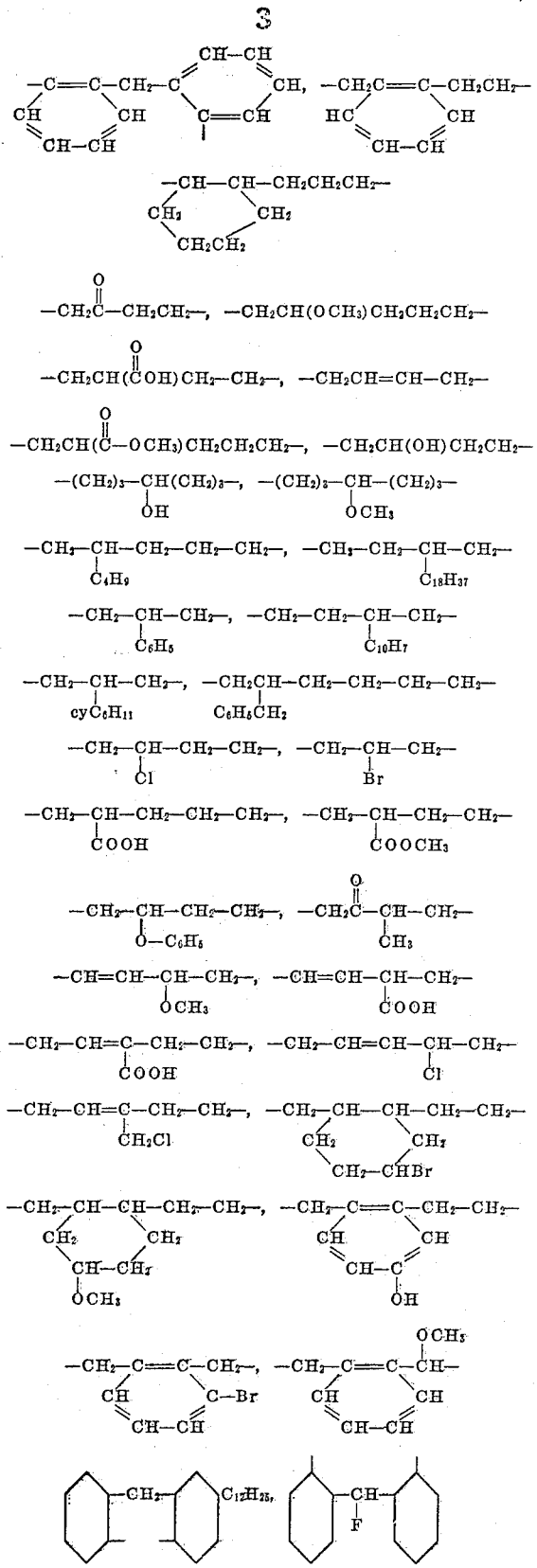

and similar structures.

The mercaptans that may be used in the above synthesis include alkyl, cycloalkyl, aryl, alkaryl, and aralkyl mercaptans containing from 1 to 18 carbon atoms in the hydrocarbon radical. Mercaptans which are suitable for this reaction include methyl mercaptan, ethyl mercaptan, butyl mercaptan, hexyl mercaptan, 2-ethylhexyl mercaptan, decyl mercaptan, dodecyl mercaptan, hexadecyl mercaptan, octadecyl mercaptan, phenyl mercaptan, tolyl mercaptan xylyl mercaptan, benzyl mercaptan, cyclohexyl mercaptan, and derivatives thereof containing substituents which are inert toward the reactants and products of this reaction.

The conditions of carrying out the above reactions generally vary somewhat in accordance with the type of reactants being used. The preferred starting materials are carbocyclic peroxides of the type obtained by reaction of oxygen with cycloalkanols and derivatives of cycloalkanes, or of hydrogen peroxide with cycloalkanones. For example, hydrogen peroxide reacts readily with cycloalkanones such as cyclobutanone, cyclopentanone, cyclohexanone, cyclopentanone, and cyclodecanone to produce the corresponding cycloalkanol hydroperoxide. The oxidation of cycloalkanols produces similar compounds. The oxidation of substituted cycloalkanes produces substituted cycloalkane hydroperoxides as indicated in the second section listed above.

The carbocyclic peroxide, e.g., cycloalkanol hydroperoxide, alkoxycycloalkyl hydroperoxide, or alkylcycloalkyl hydroperoxide is reacted in an inert solvent with a redox reducing agent and a mercaptan. The term "redox" is used herein in its generally accepted sense to designate a reduction-oxidation reaction wherein an electron transfer takes place with the simultaneous formation of a free radical. In order for this reaction to take place, it is necessary that there be present a substance (or substances) which acts as a reducing agent for the peroxide compound. Those lower-valence compounds of heavy metals which are capable of existing in several valence states, such as iron, chromium, manganese, cobalt, copper, molybdenum, and tin, are suitable reducing agents to be used. Certain organic and inorganic compounds may also be used, such as sodium bisulfite, reducing sugars, 1-ascorbic acid, sodium formaldehyde sulfoxylate, and other reducing agents known in the redox art. The temperature of the reaction may vary from $-100°$ C. to $+100°$ C. depending upon the stability of the reactants although temperatures of $-25°$ to $+25°$ C. are preferred. Some of the peroxides are quite unstable, consequently the temperature of the reaction may have to be held quite low (viz., at or below about $0°$ C.) to prevent premature decomposition of these compounds. The reaction is preferably carried out in a mutual solvent for the carbocyclic peroxide compounds and the redox agent. Suitable solvents are water, alcohols, aromatic hydrocarbons, ethers, esters, dioxane, and mixed solvents. The reaction may also be carried out in a dispersed or an emulsified medium. When an inorganic ferrous salt is used as the reducing agent, aqueous methanol is the preferred solvent. When ferrous salts of fatty acids are used, inert non-aqueous solvents are preferred. The reaction does not appear to be dependent upon pressure and may be carried out at any desired pressure, atmospheric pressure being preferred. The reactions may be carried out in a neutral or acid environment and in a batch-wise or continuous manner. Some of the peroxides are explosive and sensitive to shock, and therefore proper precautions should be taken in handling these materials.

Where the initial reactant in the foregoing series of reactions is an alkyl-substituted cycloalkyl hydroperoxide, the reaction product is an alkyl- or arylmercapto-substituted ketone. These ketones have a wide liquidus range and are useful as high-temperature lubricants, hydraulic fluids, and the like. These ketones can also be oxidized to acids and then esterified to produce esters which have excellent high-temperature lubricating properties. Where the initial reactant in the foregoing series of reactions is a cycloalkanol hydroperoxide, the product of reaction is an alkyl- or arylmercapto-substituted aliphatic acid which may be esterified with a $C_6$–$C_{18}$ alkanol to produce an ester having a wide liquidus range, high viscosity index, and other properties desirable for a high-temperature lubricant. These esters may be used as hydraulic fluids, brake fluids, or for lubricating moving parts in very-hightemperature engines such as turbojet engines and rocket engines. Where the initial reactant is an alkoxy- or aryloxy-substituted cycloalkane hydroperoxide, an alkyl or aryl ester of the mercapto-substituted aliphatic acid is obtained directly.

The following examples illustrate the preparation of alkylmercapto-substituted ketones from alkyl-substituted cycloalkane peroxides and mercaptans in the presence of a redox reducing agent.

*Example I*

An aqueous methanol solution of one mol of ferrous sulfate, 50 cc. of concentrated sulfuric acid, and 1.0 mol of propyl mercaptan is cooled to 0° C. with an ice-water bath. A methanol solution of 0.94 mol of 1-methylcyclopentyl-1-hydroperoxide (prepared by oxidation of methylcyclopentane) is slowly added to the other reactants, with stirring. After 1 hour and 30 minutes further stirring, the reaction mixture is diluted with water to produce a water solution and a separate organic phase. The organic phase is decanted and fractionally distilled to recover 6-propylmercapto-2-hexanone as reaction product, together with 2-hexanone and propyldisulfide as by-products. The 6-propylmercapto-2-hexanone has a wide liquidus range and other desired lubricating properties and may be used as a high-temperature lubricant.

*Example II*

A small quantity of n-hexylcyclohexane is oxidized with gaseous oxygen for about 48 hours to produce a substantial yield of 1-hexylcyclohexyl-1-hydroperoxide.

An aqueous ethanol solution containing one mol of chromous chloride, 50 cc. of concentrated sulfuric acid, and 0.5 mol of 2-ethylhexyl mercaptan is cooled to 10° C. with an ice-bath. To this mixture there is added with agitation a solution of 1.0 mol of 1-hexylcyclohexyl-1-hydroperoxide. The addition of the peroxide requires about 20 minutes, and the reaction mixture is maintained at 10° C. and agitated for an additional 1 hour and 30 minutes. At the end of this time, the reaction mixture is diluted with water to form a water solution and a separate organic phase. The organic phase is removed and fractionally distilled to recover 1-(2-ethylhexylmercapto)-6-dodecanone, together with by-products comprising 6-dodecanone and di(2-ethylhexyl) disulfide.

*Example III*

An aqueous methanol solution containing one mol of stannous chloride, 50 cc. of concentrated sulfuric acid, and 0.5 mol of phenyl mercaptan (thiophenol) is maintained at room temperature (about 25° C.). To this solution there is gradually added, with stirring, over a period of about 20 minutes 1.0 mol of 1-methylcyclohexyl-1-hydroperoxide. The reaction mixture is maintained at room temperature and the heat of reaction removed by use of an ice-bath. The mixture is stirred for about 2 hours and then diluted with water to separate the water-soluble by-product from the other products of reaction. Upon dilution with water, the reaction mixture forms an aqueous phase and an immiscible organic phase. The organic phase is recovered and fractionally distilled under vacuum to recover 7-phenylmercapto-2-heptanone, and by-products comprising mainly 2-heptanone and diphenyl disulfide.

The following examples demonstrate the applicability of this process to the preparation of alkyl- or arylmercapto-substituted organic acids which are useful as intermediates in the preparation of esters which may be used as high-temperature lubricants.

*Example IV*

A solution of 0.49 mol of cyclohexanol hydroperoxide in 750 cc. of methanol was cooled to 0° C. To this solution there was added 25.7 g. (0.535 mol) of methyl mercaptan. Following the addition of the mercaptan, there was added drop-wise, over a period of 2¾ hours, a ferrous salt solution containing 147 g. of ferrous sulfate heptahydrate, 300 cc. of distilled water, and 25 cc. of concentrated sulfuric acid. After the ferrous salt solution was added, the reaction mixture was diluted with one liter of distilled water and the organic phase which separated was collected. The water-alcohol phase was agitated with 100 cc. of benzene to extract residual organic material, and this extract and the organic phase were combined, water-washed, and dried over anhydrous $CaSO_4$. The solution was then filtered and distilled to remove benzene. The solution which remained contained methyl 6-methylmercaptohexanoate and some free acid.

For more complete esterification, the solution was mixed with 125 cc. of methanol and 7.5 g. of p-toluene sulfonic acid (as catalyst), and refluxed for 18 hours. The resulting mixture was then diluted with 100 cc. of distilled water and the organic phase which separated was collected. The water-alcohol solution was extracted 4 successive times with 13-cc. portions of benzene, and the combined benzene extract and organic phase was water-washed until neutral to litmus. The benzene was removed by distillation using a 12″ Vigreaux column, and 43.3 g. of crude methylhexanoate was collected at 145°–149° C. Then, under the vacuum produced by a water-pump, 9.1 g. of crude methyl 6-methylmercaptohexanoate was recovered at 117°–129° C. at 15 mm. pressure. The yield of the methyl 6-methylmercaptohexanoate was 21 mol percent based on peroxide. Product identification was by elemental analysis, saponification number, and molecular weight. Methyl 6-methylmercaptohexanoate has a theoretical molecular weight of 176, a saponification number of 314, and contains 18.1% sulfur. The product recovered had a molecular weight of 172, a saponification number of 303, and contained 16.7% sulfur.

*Example V*

Cycloheptanone is oxidized with hydrogen peroxide to produce cycloheptanol hydroperoxide. Cyclopetanol hydroperoxide and n-butyl mercaptan are dissolved in aqueous ethanol and maintained at room temperature during the reaction by use of an ice-bath. An ethanol solution of cobaltous acetate and concentrated sulfuric acid is added drop-wise over a period of about 2½ hours. After addition of the reducing agent is complete, the reaction mixture is diluted with distilled water and the organic products recovered as in Example IV. This reaction produces a substantial yield of butylmercaptoheptanoic acid, which is recovered either by distillation, by crystallization, or by esterification as in Example IV.

*Example VI*

The procedure of Example IV is repeated using cyclodecanol hydroperoxide, methyl meracptan, and cuprous cyanide as the reactants. The product of this reaction is methylmercaptodecanoic acid, or an ester thereof (if the acid is recovered by esterification).

*Example VII*

A solution of 0.49 mol of cyclohexanol hydroperoxide in 750 cc. of methanol was cooled to 0° C. To this solution was added 46.5 g. (0.40 mol) of phenyl mercaptan. Following the addition of the mercaptan, there was added drop-wise over a period of 45 minutes a ferrous salt solution containing 147 g. of ferrous sulfate heptahydrate, 300 cc. of distilled water, and 25 cc. of concentrated sulfuric acid. After the ferrous salt solution was added, the reaction mixture was filtered and a solid, white material collected. This material was recrystallized from ethanol, and was identified as diphenyl disulfide on the basis of melting point and mixed melting point. The diphenyl disulfide yield was 25.4 g., or 56.7 mol percent based on phenylmercaptan. The organic liquid phase was diluted with 1250 cc. of distilled water and the organic phase which separated was collected. The water-alcohol phase was agitated with 100 cc. of benzene to extract residual organic material, and this extract and the organic phase were combined, water-washed, and dried over anhydrous $CaSO_4$. The solution was then filtered and distilled to remove benzene. Then with a 12" Vigreaux column a fraction of 5.8 g. of crude methyl 6-phenylmercaptohexanoate was collected at 87° to 108° C. at 0.01 mm. pressure. The yield of crude methyl 6-phenylmercaptohexanoate was 9.6 mol percent based on the cyclic peroxide. Product identification was by conversion of the ester to the corresponding phenylmercaptohexanoic acid followed by elemental analysis and determination of acid equivalent. Phenylmercaptohexanoic acid has a theoretical acid equivalent of 224 and contains 14.3% sulfur. The product recovered had an acid equivalent of 216 and contained 11.7% sulfur.

*Example VIII*

Cyclohexanol hydroperoxide (0.51 mol) in 750 cc. of methanol is cooled to 10° C., and 205 g. (0.5 mol) of dodecyl mercaptan is added. There is then added dropwise a ferrous salt solution containing 150 g. of ferrous sulfate heptahydrate, 300 cc. of distilled water, and 25 cc. of concentrated sulfuric acid. Addition time is 2½ hours, after which the reaction is substantially complete. After the addition of the ferrous salt solution is completed, the reaction mixture is diluted with one liter of distilled water. The organic phase which separates is collected and the water-alcohol phase is extracted with benzene to recover residual organic material. The benzene extract and organic phase are combined, water-washed and dried over anhydrous $CaSO_4$. The solution is then filtered and distilled to remove benzene. Distillation under vacuum yields the desired product, dodecylmercaptohexanoic acid, and the methyl ester thereof.

When this reaction is repeated using other redox reducing agents, such as ferrous bromide and manganous phosphate, the cyclohexanol hydroperoxide is decomposed and the dodecylmercapto-substituted acid is obtained as above-described.

*Example IX*

An alternate method of preparing the mercapto-substituted acids is by reaction of a soduim mercaptide with an omego-halogen-substituted aliphatic acid. To 300 cc. of 18% sodium hydroxide solution was added 34.4 g. (0.17 mol) of dodecyl mercaptan, 24.6 g (0.15 mol) of methyl 6-chlorohexanoate (prepared by reaction of cyclohexanol hydroperoxide, ferrous sulfate and chlorine in methanol solution), and 50 cc. of ethanol. The mixture was heated gently to reflux temperature. The refluxing was continued for 3 hours, initially under the effect of the heat of reaction (the reaction is highly exothermic). The alcohol was removed by distillation, and after cooling, the mixture was extracted with ether to remove any unreacted organic material. The aqueous alkaline solution was then acidified with dilute hydrochloric acid and the organic acid liberated was collected in ether solution. Ether was evaporated leaving dodecylmercaptohexanoic acid as the residue. This product was identified by molecular weight determination and elemental analysis.

*Example X*

Cyclohexanol hydroperoxide and benzyl mercaptan are reacted in ethanol solution in the presence of ferrous bromide, following the procedure used in Example IV. Products of the reaction are benzylmercaptohexanoic acid and its ethyl ester. The desired product is recovered by completing the esterification with ethanol and separating the ester by fractional distillation under vacuum (at pressures of the order of 1 mm. Hg and less).

*Example XI*

Cyclohexanol hydroperoxide and octadecyl mercaptan are reacted in aqueous methanol solution in the presence of ferrous sulfate, following the procedure used in Example IV. Products of the reaction are octadecylmercaptohexanoic acid and its methyl ester. Upon complete esterification, the ester product can be recovered by fractional distillation under vacuum of about 0.002 mm. Hg.

*Example XII*

To 40 g. of dodecylmercaptohexanoic acid (which can be prepared by the procedure of Examples VIII or IX) was added 100 cc. of 2-ethylhexanol, 1.0 g. of p-toluene sulfonic acid (as catalyst) and 50 cc. of toluene as solvent. The mixture was refluxed in apparatus provided with a water trap until there was no further collection of water in the trap, thus indicating completion of the reaction. After esterification was complete, the mixture was water-washed until neutral to litmus, and dried over $CaSO_4$. The product was then subjected to distillation under vacuum, and volatile products (excess 2-ethylhexanol and reaction by-products) were removed up to an overhead temperature of 130° C. at 0.6 mm. Hg pressure. The product was further purified by heating at 100° C. for one hour with a powdered alumina desiccant and then filtered. The product had a molecular weight of 395, compared to a theoretical of 428, and a sulfur content of 7.6%, compared to a theoretical sulfur content of 7.5%. The product was substantially neutral, having an acid number of 1.54. This ester (2-ethylhexyl dodecylmercaptohexanoate) is useful as a lubricant for high-temperature applications. It has a viscosity of 70.9 S.U.S. at 100° F., 38.1 S.U.S. at 210° F., and a V.I. of 174. This ester has a very wide liquidus range, having a pour point of 15° F. and a boiling point in excess of 650° F.

*Example XIII*

6-octylmercaptohexanoic acid and 2-ethylhexanol are reacted using the procedure of Example XII. The product of reaction is a liquid ester, 2-ethylhexyl octylmercaptohexanoate. This ester has a high V.I. (in excess of 100) and a wide liquidus range, being liquid from room temperature up to 600° F. and higher. It has lubricating properties and may be used as a high-temperature lubricant.

*Example XVI*

4-hexylmercaptobutanoic acid and lauryl alcohol ($C_{12}H_{25}OH$) are reacted, according to the procedure used in Example XII, to yield dodecyl hexylmercaptobutanoate as the product of reaction. The ester which is obtained from this reaction has a high V.I. and a wide liquidus range, having a boiling point in excess of 650° F., and is useful as a high-temperature lubricant.

*Example XV*

Cetyl alcohol ($C_{16}H_{33}OH$) and omega-hexadecylmercaptodecanoic acid are reacted using the procedure of Example XII. The product of reaction is hexadecyl hexadecylmercaptodecanoate. This ester is a viscous liquid having a high V.I. and a boiling point in excess of 650° F. This liquid is useful as a high-temperature lubricant.

*Example XIV*

The esters of mercapto-substituted aliphatic acids can be prepared directly by reaction of alkoxy- or aryloxy-substituted cycloalkane peroxides with mercaptans under redox conditions. When n-hexyl cyclohexyl ether is oxidized slowly, there is obtained 1-hexoxycyclohexyl-1-hydroperoxide. The addition of a methanol solution of this peroxide to a solution of 2-ethylhexyl mercaptan containing a redox reducing agent (as in Example II) yields an oily product, n-hexyl 2-ethylhexyl-mercaptohexanoate. When other alkoxy-substituted cyclic peroxides, e.g., 1-methoxycyclohexyl-1-hydroperoxide, 1-decoxycyclopentyl-1-hydroperoxide, or aryloxy-substituted cyclic peroxides, e.g., 1-phenoxycyclohexyl-1-hydroperoxide, are used, similar esters are obtained.

We have found that esters of the general formula R'S—(CH₂)ₙ—C(O)OR", where R' is an alkyl or aryl radical containing 6 to 18 carbon atoms, n is between 4 and 10, and R" is an alkyl radical containing 6 to 18 carbon atoms (not necessarily the same as R') have the physical properties required of a high-temperature synthetic lubricant. These compounds are clear viscous liquids, have high boiling points (in excess of 650° F.), low pour points (room temperature and below), and high viscosity indexes (in excess of 100). These liquids have lubricating properties and are quite stable at high temperatures. In addition to the esters set forth in Examples XII to XV, other esters which are within the scope of the general formula and useful as high-temperature lubricants are 2-ethylhexyl 7-decylmercaptoheptanoate, tridecyl 6-t-dodecylmercaptohexanoate, octadecyl 5-octylmercaptopentanoate, and n-hexyl 8-octadecylmercaptooctanoate. While the esters described above are useful as high-temperature lubricants, they are also useful generally as functional fluids, e.g., hydraulic fluids, hydraulic coupling or torque converter fluids, brake fluids, and the like.

This application is a continuation-in-part of our copending application Serial No. 705,804, filed December 30, 1957, now forfeited.

The embodiments of the invention in which an exclusive property or privilege is claimed are defined as follows:

1. A process for the preparation of mercapto-substituted compounds which comprises reacting a carbocyclic peroxide of the formula,

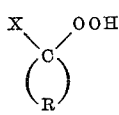

where R is a divalent radical selected from the group consisting of C₃–C₉ polymethylene chains, C₃–C₉ polymethylene chains containing a double bond, C₃–C₉ polymethylene chains containing a phenylene group, C₃–C₉ polymethylene chains containing a cycloalkylene group, and derivatives thereof containing substituents selected from the group consisting of hydroxy, keto, alkyl, aryl, alkylaryl, cycloalkyl, alkoxy, aryloxy, carboxy, carbalkoxy, and halogen radicals, and X is selected from the group consisting of OH, hydrocarbyloxy, and hydrocarbyl radicals, with a C₁–C₁₈ mercaptan, in the presence of a redox reducing agent, in an inert solvent, at a temperature of —100° to +100° C., and recovering a compound of the formula, R'S—RC(O)X, where R'S is derived from the mercaptan reactant, and R and X are as above defined, from the resulting reaction mixture.

2. A process according to claim 1 in which X is OH, the reaction product is a mercapto-substituted monocarboxylic aliphatic acid, and is esterified with a C₆–C₁₈ alkanol to produce a liquid ester thereof.

3. A process according to claim 1 in which the redox reducing agent is a salt of a multivalent metal in a lower valence state.

4. A process according to claim 3 in which the redox reducing agent is of the group consisting of ferrous, stannous, chromous, manganous, cobaltous, and cupros salts.

5. A process according to claim 1 in which the reactant mercaptan in methyl mercaptan.

6. A process according to claim 1 in which the reactant mercaptan in 2-ethylhexyl mercaptan.

7. A process according to claim 1 in which the reactant mercaptan is dodecyl mercaptan.

8. A process according to claim 1 in which the reactant mercaptan is octadecyl mercaptan.

9. A process according to claim 2 in which the reactant mercaptan is phenyl mercaptan.

10. A process according to claim 1 in which the reactant mercaptan is benzyl mercaptan.

11. A process according to claim 1 in which the cyclic peroxide is of the formula,

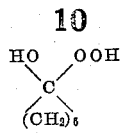

12. A process according to claim 1 in which the cyclic peroxide is of the formula,

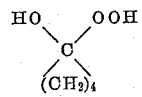

13. A process according to claim 1 in which the cyclic peroxide is of the formula,

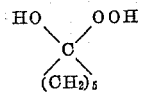

14. A process according to claim 1 in which the cyclic peroxide is of the formula,

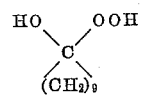

15. A process according to claim 1 in which the cyclic peroxide is of the formula,

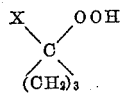

where X is lower alkyl.

16. A process according to claim 1 in which the cyclic peroxide is of the formula,

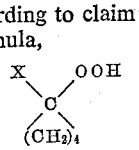

where X is lower alkyl.

17. A process according to claim 1 in which the cyclic peroxide is of the formula,

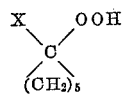

where X is lower alkyl.

18. A process according to claim 1 in which the cyclic peroxide is of the formula,

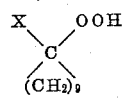

where X is lower alkyl.

19. A process according to claim 1 in which the substituent X on the carbocyclic peroxide is a methyl radical.

20. A process according to claim 1 in which the substituent X on the carbocyclic peroxide is a hexyl radical.

21. A process according to claim 2 in which X on the carbocyclic peroxide is hexoxy.

22. A process according to claim 1 in which X on the carbocyclic peroxide is phenoxy.

23. A process which comprises reacting 1-methylcyclopentyl hydroperoxide with n-propyl mercaptan and a redox reducing agent, and recovering 6-propylmercapto-2-hexanone from the resulting reaction mixture.

24. A process which comprises reacting 1-hexylcyclohexyl-1-hydroperoxide with 2-ethylhexyl mercaptan and recovering

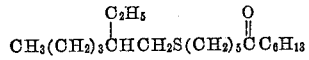

from the resulting reacting mixture.

25. A process which comprises reacting cyclohexanol hydroperoxide with methyl mercaptan and a redox reducing agent and recovering methylmercaptohexanoic acid from the resulting reaction mixture.

26. A process according to claim 19 in which the redox reducing agent is a ferrous salt, and the reaction is carried out at −25° to +25° C.

27. A process which comprises reacting cycloheptanol hydroperoxide with n-propyl mercaptan in aqueous alcohol solution at −25° to +25° C. in the presence of a redox reducing agent and recovering n-propylmercaptoheptanoic acid from the resulting reaction mixture.

28. A process which comprises reacting cyclopentanol hydroperoxide in aqueous alcohol solution with amyl mercaptan and a redox reducing agent at −25° to +25° C., and recovering amylmercaptopentanoic acid from the resulting reaction mixture.

29. A process which comprises reacting cyclodecanol hydroperoxide with methyl mercaptan and a redox reducing agent in aqueous alcohol solution at −25° to +25° C., and recovering methylmercaptodecanoic acid from the resulting reaction mixture.

30. A process which comprises reacting cyclohexanol hydroperoxide and phenyl mercaptan with a redox reducing agent in aqueous alcohol solution at −25° to +25° C., and recovering phenylmercaptohexanoic acid from the resulting reaction mixture.

31. A process which comprises reacting cyclohexanol hydroperoxide with dodecyl mercaptan and a redox reducing agent in aqueous alcohol solution at −25° to +25° C., and recovering dodecylmercaptohexanoic acid from the reaction mixture.

No references cited.

UNITED STATES PATENT OFFICE
CERTIFICATE OF CORRECTION

Patent No. 3,061,619　　　　　　　　　　October 30, 1962

John B. Braunwarth et al.

It is hereby certified that error appears in the above numbered patent requiring correction and that the said Letters Patent should read as corrected below.

Column 8, line 43, for the heading "Example XVI", in italics, read -- Example XIV --, in italics; line 61, for the heading "Example XIV", in italics, read -- Example XVI --, in intlics; column 9, line 43, for "aryloxyl" read -- aryloxy --; lines 63 and 65, for "in", each occurrence, read -- is --; same column , line 70, and column 10, line 57, for the claim reference numeral "2", each occurrence, read -- 1 --.

Signed and sealed this 3rd day of September 1963.

(SEAL)
Attest:

ERNEST W. SWIDER
Attesting Officer

DAVID L. LADD
Commissioner of Patents